United States Patent [19]

Hasler

[11] 4,366,722
[45] Jan. 4, 1983

[54] DRIVE CONNECTION BETWEEN LINEAR ACTUATOR AND ROTATABLE DRIVE SHAFT OF REVERSIBLE MOTOR

[75] Inventor: Alfred Hasler, Mountain View, Calif.

[73] Assignee: International Memories, Incorporated, Cupertino, Calif.

[21] Appl. No.: 163,124

[22] Filed: Jun. 26, 1980

[51] Int. Cl.³ .................. F16H 21/44; G11B 5/56
[52] U.S. Cl. .................. 74/99 R; 74/89.2; 74/108; 360/106
[58] Field of Search .............. 74/89.2, 89.21, 89.22, 74/99 R, 108; 360/106, 109

[56] References Cited

U.S. PATENT DOCUMENTS

| | | | |
|---|---|---|---|
| 1,317,150 | 9/1919 | Allmand et al. | 74/89.21 |
| 2,690,082 | 9/1954 | Orcutt | 74/108 |
| 3,645,144 | 2/1972 | Barrows | 74/89.2 |
| 4,161,004 | 7/1979 | Dalziel | 74/89.2 |
| 4,170,146 | 10/1979 | Owens | 74/89.2 |
| 4,198,871 | 4/1980 | Dunn et al. | 74/37 |

FOREIGN PATENT DOCUMENTS 1106380  12/1955  France ............... 74/89.21

Primary Examiner—Lawrence J. Staab
Attorney, Agent, or Firm—Townsend and Townsend

[57] ABSTRACT

A connector for coupling the drive shaft of a reversible motor to a linear actuator, such as an actuator which carries a magnetic read-write head of a magnetic disk drive system. The actuator has a generally flat side plate at one side of the drive shaft of the motor. A flexible, metallic band is wrapped around the drive shaft and one end of the band is secured to one end of the side plate. The opposite end of the band extends through a slot in the band and is doubled upon itself near its opposite end to form a U-shaped recess near the opposite end of the side plate. A bore extends into the opposite end of the plate and receives a pin which is biased outwardly by a spring, and the outer end of the pin engages a cylindrical cross bar which bears against the inner surface of the band portion which forms the U-shaped recess. The opposite end of the band is secured to the side plate. The spring, pin and bar exert a tension force on the band to prevent backlash and to compensate for ambient temperature variations.

8 Claims, 6 Drawing Figures

DRIVE CONNECTION BETWEEN LINEAR ACTUATOR AND ROTATABLE DRIVE SHAFT OF REVERSIBLE MOTOR

This invention relates to improvements in a connector for coupling the drive shaft of a motor to a linear actuator and, more particularly, to an improved connector of this type which has tensioning means to eliminate backlash and other errors.

BACKGROUND OF THE INVENTION

Flexible, slotted metallic bands have been used in the past to connect the drive shaft of a reversible motor to a linear actuator so that rotational motion of the motor drive shaft can be transformed into linear motion of the actuator. For the most part, such bands do not provide error-free connection of the actuator and the motor drive shaft because the band give rise to backlash problems and problems relating to expansion and contraction of the band due to ambient temperature variations. Errors arising because of such problems become extremely significant when the actuator is used to support and to move magnetic read-write heads of a magnetic disk drive assembly.

Because of these problems associated with conventional connector bands, a need has arisen for improvements in the mounting of such a band to eliminate backlash and temperature variation problems and to assure immediate response of a linear actuator to the rotation of a reversible drive motor.

SUMMARY OF THE INVENTION

The present invention satisfies the aforesaid need by providing an improved connector assembly which couples the drive shaft of a reversible motor to a linear actuator wherein the assembly includes a metallic, flexible, slotted band which is wrapped around the drive shaft of the motor and is connected at its ends to a lateral plate-like extension of the actuator. The band extends along the surface of the extension to the ends thereof and, at one end of the extension, the band is doubled upon itself and secured to the opposite surface of the extension. The doubled portion presents a U-shaped recess which is biased outwardly of the extension by a tensioning means including a pin and spring in a bore in the end of the extension and a bar engaged by the pin and bearing against the inner surface of the doubled portion of the band. In this way, a constant tension is maintained on the band to assure a tight fit of the band about the drive shaft of the motor at all times notwithstanding ambient temperature variations in the vicinity of the band. By mounting the band in this way, the band prevents backlash and the band can expand or contract due to temperature variation without affecting the essentially constant tension exerted on the band by the tensioning means. This assures an instantaneous response of the linear actuator as a function of the rotation of the drive shaft of the motor.

The primary object of this invention is to provide an improved connector assembly for coupling a linear actuator to the drive shaft of a reversible motor wherein the assembly substantially eliminates backlash and compensates for ambient temperature variations near the actuator to thereby eliminate errors arising from these conditions which would have otherwise a significant negative impact on the purpose for which the actuator is used.

Another object of the present invention is to provide an assembly of the type described wherein the assembly includes a flexible, metallic band which is to be wrapped around the drive shaft of the motor and to be coupled at its ends to the actuator wherein the band is associated with means for applying tension to one end of the band to permit a constant tension to be exerted on the band notwithstanding ambient temperature variations to thereby eliminate backlash and other errors encountered in conventional connector assemblies using bands of this type.

Other objects of this invention will become apparent as the following specification progresses, reference being had to the accompanying drawings for illustrations of the invention.

IN THE DRAWINGS

Figure 1:
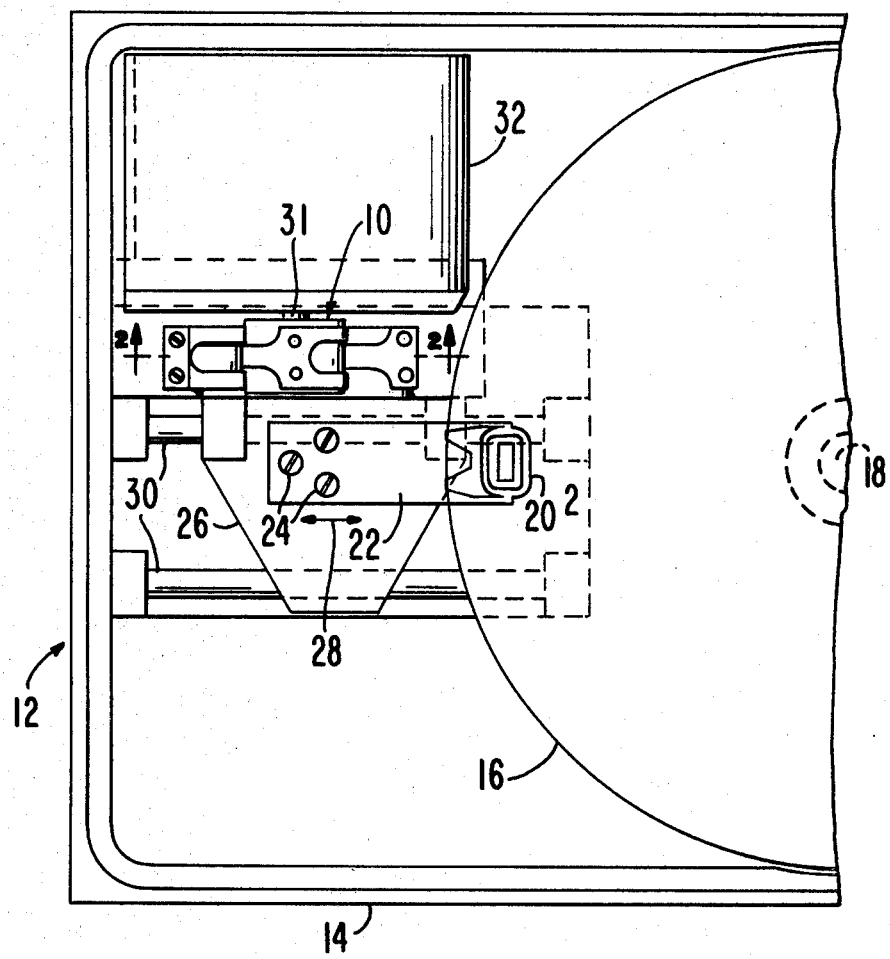
FIG. 1 is a fragmentary, top plan view of a magnetic disk drive system showing the improved connector assembly for coupling the reversible drive motor of the system with a linear actuator carrying the magnetic heads of the system.

The connector assembly of the present invention is broadly denoted by the numeral 10 and, for purposes of illustration, is adapted to be used with a magnetic disk drive system 12 of the type having a housing 14, one or more magnetic discs 16 mounted in housing 14 for rotation about the axis of a generally vertical shaft 18 rotatably mounted in some suitable manner in the housing. A drive motor (not shown) is used to rotate shaft 18 to, in turn, rotate disks 16 past one or more magnetic read-write heads 20, whereby digital data can be read from and written onto each of disks 16.

Heads 20 are mounted at one end of a rigid bar 22 which is secured by screws 24 to a linear actuator 26 moveable back and forth in the direction of arrows 28 along a pair of spaced, generally parallel tracks 30 carried by housing 14. Actuator 26 is coupled to the drive shaft 31 of a reversible drive motor 32 by connector assembly 10 so that, by providing specific input signals to drive motor 32, the drive shaft 34 of the drive motor will rotate in a specific direction and through a specific arc to, in turn, cause connector assembly 10 to transform rotation of the drive shaft to linear motion of actuator 26, the latter, in turn, causing the corresponding movement of heads 20.

Figure 3:
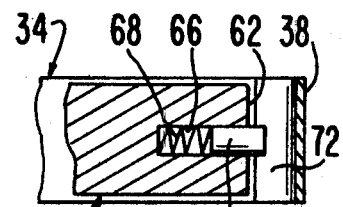
FIG. 3 is a fragmentary, plane view, partly in section, of the tensioning means for the band.
Figure 4:
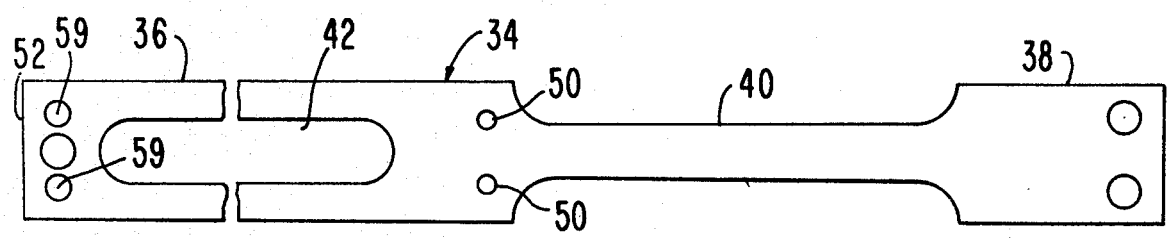
FIG. 4 is an enlarged, plan view of the band in its flattened condition before it is mounted on the rotor of the drive motor.
Figure 5:
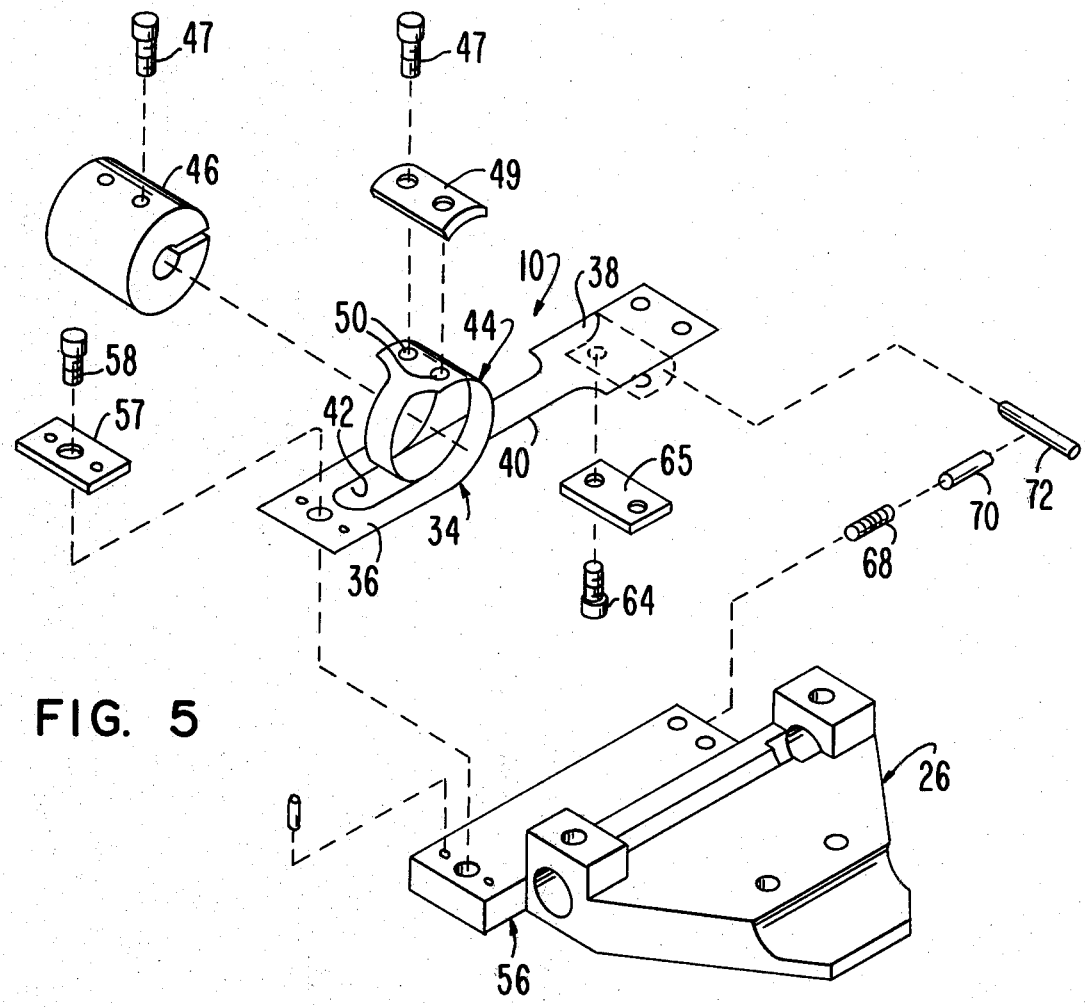
FIG. 5 is an exploded view of the connector assembly, the rotor and the linear actuator.
Figure 6:
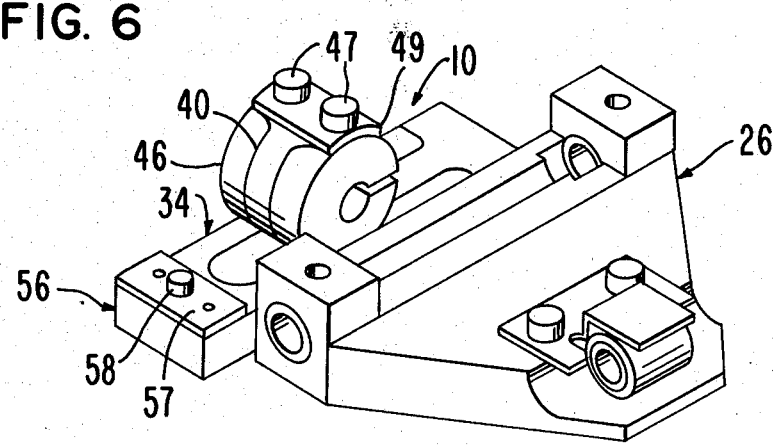
FIG. 6 is a perspective view of the linear actuator with the connector assembly thereon.

Connector assembly 10 includes an elongated slotted band 34 of flexible, metallic material, such as a steel alloy. The band 34 is formed in any suitable manner, such as by a stamping process and initially has the flattened shape as shown in FIG. 4. The band has two enlarged end parts 36 and 38 and a narrow neck 40 interconnecting and integral with parts 36 and 38. A slot 42 is formed in end part 36 for receiving end part 38 so that band 34 can be formed in the shape of a loop 44 (FIG. 2) for placement around a rotor 46 secured by a screw 48 to the end of drive shaft 31. Loop 44 is secured by a pair of screws 47 passing through a curved retainer plate 49, through holes 50 (FIG. 3) in band 34 and into threaded holes in rotor 46.

End part 36 of band 34 is secured to one end 54 of a bar or plate-like extension 56 rigid to one side of actuator 26 by a screw 58 which passes through a retainer plate 47 and a hole 59 in band 34 and is threaded into extension 56. This extension has a flat upper surface along which portions of the band extend.

Figure 2:
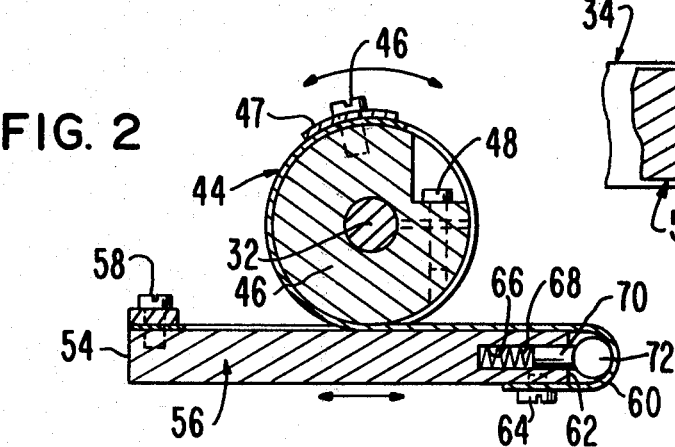
FIG. 2 is an enlarged, cross-sectional view taken along line 2—2 of FIG. 1.

End part 38 is flexed and doubled back to form a U-shaped end margin 60, defining a recess near end face 62 of extension 56 as shown in FIG. 2. End margin 60 is spaced outwardly from end face 62 of extension 56, and a pair of screws 64 secures the lower leg of the band to the bottom flat surface of extension 56 by way of a retainer plate 65.

Extension 56 has a bore 66 extending thereinto from end face 62 thereof. The bore is centrally located in the extension and receives a coil spring 68 which bears against one end of a shiftable pin 70 which is partially in the bore and which is coupled at its other end to a cylindrical bar 72 in the manner shown in FIGS. 2 and 3. Spring 68 is normally under compression and biases pins 70 and 72 outwardly against the inner concave surface of end part 38 so as to apply a substantially constant tension to end part 38. This assures that there will be no backlash of rotor 46 relative to the band, and the band will be instantaneously responsive to the rotation of the motor drive shaft to avoid errors in the movements of actuator 26 and heads 20 relative to disks 16. Thus, the band with the tensioning means provided by spring 68 and pins 70 and 72 avoids the problems associated with prior art bands especially under situations where ambient temperature variations are a factor in changing the length of the band. By providing the substantially constant tension on the band, the band will expand and contract near end 38 due to ambient temperature variations without causing any change in the way the band is held in intimate contact with rotor 46.

I claim:

1. In a system of the type including a reversible motor having a drive shaft: a rotor on the drive shaft; a shiftable actuator; means coupled with the actuator for mounting the same for reciprocal movement adjacent to the motor; a connector assembly for interconnecting the drive shaft of the motor and the actuator, said assembly including a flexible band having a slot, a part of the band extending through the slot, whereby the band is in the form of a closed loop and presents a pair of end parts, said loop being placed around and coupled to the rotor of said drive shaft for rotation therewith when the motor is energized, said end parts of the band being secured to the actuator at spaced locations thereon, one end part of the band being doubled on itself to form a recess having an inner surface portion; and spring means shiftably carried within the actuator and engageable with said one end part of the band at said inner surface portion for yieldably applying tension to the band.

2. In a system as set forth in claim 1, said tensioning means including a bar in the recess, a pin shiftably mounted in the actuator and having an outer end in contact with the bar at a location intermediate the ends of the bar, and a spring in the actuator and engagable with the inner end of the pin for biasing the pin and the bar against the inner surface portion of the band.

3. In a system as set forth in claim 2, wherein said actuator has an end face provided with a bore extending thereinto, said spring and a part of the pin being in the bore.

4. In a disk drive system of the type including a reversible motor having a drive shaft and a shiftable actuator having a plate-like extension adjacent to the drive shaft, the combination with said drive shaft and said extension of a connector assembly for interconnecting the drive shaft and the extension, said assembly including a flexible band having a slot, a part of the band extending through the slot, whereby the band forms a closed loop and presents a pair of end parts, said loop extending about the drive shaft and being coupled therewith for rotation with the drive shaft; means securing the opposed ends of the band to the actuator at spaced locations thereon, one end part of the band being doubled upon itself to form a recess having an inner surface portion; and spring means shiftably carried within the extension and engageable with said one end part of the band at said inner surface portion for yieldably applying tension to said one end part.

5. In a system as set forth in claim 4, wherein said one end part is U-shaped to form said recess, said tensioning means including a bar in the recess, a pin in contact with the bar intermediate the ends thereof, and a spring for biasing the pin and the bar against said inner surface portion of one end part of the band, said pin and spring being shiftably mounted on the extension.

6. In a system as set forth in claim 5, wherein said extension has an end face provided with a bore extending thereinto, said spring and the pin being in the bore, said pin projecting partially out of said bore.

7. In a system as set forth in claim 5, wherein said bar is cylindrical and has a length substantially equal to the width of said one end part.

8. In a system as set forth in claim 4, wherein the extension has a pair of opposed, flat surfaces, said one end part extending along one of said surfaces from said loop to one end of the extension, the other end part extending along said one surface from the loop to the opposite end of the extension, said one end part being secured at its outer end to the other of said surfaces of the extension.

* * * * *